United States Patent Office 3,591,395
Patented July 6, 1971

3,591,395
HYDRAULIC CEMENTITIOUS COMPOSITIONS REINFORCED WITH FIBRILLATED PLASTIC FILM
Johannes J. Zonsveld, Woking, and Ronald Francis Salmons, Hampton Hill, England, assignors to Shell Oil Company, New York, N.Y.
No Drawing. Continuation-in-part of application Ser. No. 660,186, Aug. 14, 1967. This application June 24, 1970, Ser. No. 49,531
Claims priority, application Great Britain, Aug. 15, 1966, 36,431/66
Int. Cl. C04b 13/24, 31/34
U.S. Cl. 106—99                                       12 Claims

ABSTRACT OF THE DISCLOSURE

Concrete, mortar, cement or plaster of Paris are reinforced to provide products of improved bending strength by addition of up to 2% by weight of fibrillated polypropylene film to the mass prior to or during mixing.

---

This application is a continuation-in-part of Ser. No. 660,186, filed Aug. 14, 1967, now abandoned.

This invention relates to the manufacture of a waterhardenable mass, for example, a concrete, mortar, or plaster of Paris mix and to the manufacture therefrom of articles by casting or molding and to the use of such articles in building construction. A composition curable by the addition of water, that is, a water-settable composition or mass, is defined herein as a composition consisting wholly or mainly of a dry mixture of one or more inorganic materials, which composition upon the addition of water forms a water-hardenable mass or paste that is capable of setting to a solid coherent mass. The resulting hardened products, which do not disintegrate in water, are herein designated as hydraulic cementitious compositions.

It has been disclosed that the impact resistance and flexural strength of castings and moldings made from portland cement mixtures can be improved by the addition thereto of organic fibers such as nylon, polypropylene and polyethylene fibers, and various tests demonstrating this improvement have been described in a paper entitled "Fibrous Reinforcement for Portland Cement" by S. Goldfein in "Modern Plastics" (April, 1965, pages 156–159).

Although an article cast from a portland cement mixture which comprises one or other of the fibers referred to by Goldfein may be superior to an article made from the same mixture but without the fibers, it has been found that the use of such fibers is not entirely satisfactory.

The price of such reinforcing fibers is much higher than that of the mortar, concrete or similar water-settable masses, so that the addition of such fibers, in particular high-performance fibers such as polyolefin fibers, increases appreciably the cost of the cast article. Although the use of such a fiber-reinforced water-hardenable mass may allow cast articles of smaller dimensions to be used in a given application, or such fibers may even be substituted for expensive steel wire reinforcement in a conventional cast article, the resulting apparent cost saving can be outweighed by the high cost of the fibers. In the experiments described by Goldfein, as much as possible of the fibrous reinforcement was added to the cement mix, the upper limit being only the nature of the resulting mixture which, of course, had to remain within handleable limits. The addition of 3% by weight of nylon or 6% by weight of polypropylene, as proposed by Goldfein, would be economically prohibitive. Furthermore, the use of low-denier monofilaments chopped into short lengths entails some technical difficulties. Such filaments are normally marketed wound on small-diameter spools. A deformation of such filaments is thus generated which, after winding-off, manifests itself as a tendency to curl. Thin monofilaments in short lengths are therefore difficult to handle since the fibers ball together and cannot be distributed evenly in a water-hardenable mass. Unravelling of the fibers, as mentioned by Goldfein in his paper, is a cumbersome and time-consuming operation which is unacceptable commercially.

According to the present invention, a method of producing an article from a wet mixture of water-hardenable inorganic material(s) and water comprises casting or molding the article from a water-hardenable mass comprising the inorganic material(s) and water containing in admixture therewith 0.05 to 2% by weight, based on the total amount of water and inorganic material(s) comprised in the mass, of fibrous reinforcing elements formed from a stretched and then fibrillated plastics film material which is preferably a polyolefin film. The use of either continuous filaments or short segments of fibrillated plastics film material is herein contemplated. The fibrillated plastics film may advantageously be added to the wet mixture of the inorganic material(s) and water while the mixture is being prepared in any conventional mixer known in the art, for example, a tumbling mixer. Preferably, the fibrillated plastics film is added shortly before the end of the mixing operation. One-half minute is usually sufficient for thorough mixing, although longer or shorter times may be desirable under various situations. Alternatively, the dry water-settable mass of inorganic material(s) is first mixed with 0.05 to 2% by weight, based on the total weight of the wet mixture, of the fibrillated plastic material and this dry mix of inorganic materials and fibrillated plastic material is blown through the nozzle of a compression while water is sprayed in at the last moment when the dry mix leaves the nozzle of the compression. This process is known commercially as "Guniting." This invention also contemplates the use of a woven mesh of the plastics material in widths up to 1 meter for applications where orientation of the fibers in slabs or flat panels is desired. A similar advantage is obtained by strewing the fibrillated reinforcing elements in during the filling of the mold or during screeding. A flat article or paving is thus obtained having the reinforcing elements oriented in the plane where they are most efficient. The present invention also includes the articles resulting from the methods herein described.

The word "film" is used herein to denote plastics sheet material which is of a thickness such that it can be fibrillated, either as such or when split or cut into tapes, ribbons or filaments, after the appropriate degree of uniaxial orientation has been produced therein by stretching. The term "fibrillated" is used herein to denote such a plastics film which is in a state of fibrillation as a result of having been subjected to a physical treatment which induces such fibrillation, or such a plastics film which is in a state of "imminent fibrillation" such that actual fibrillation can be induced under the frictional conditions which arise when such film is mixed with the components (including water) of a water-hardenable mass. The word "plastics" is used herein to include any macromolecular substance, including such a substance in cellular (foamed) form, which in film form can be stretched and then fibrillated; accordingly, while the present invention is particularly applicable to fibrous reinforcing elements formed from a stretched and then fibrillated polyolefin film (i.e., a film formed from an olefin polymer or copolymer, for example, polypropylene, including foamed polypropylene, or a composition mainly comprising such a polymer or copolymer), it is to be understood that the invention can be applied to the use of any other plastic which is fibrillatable in the form of a stretched film. Usually, but not necessarily, said water-hardenable mass will contain a large number of said reinforcing elements, for example, of the order indicated in the following description.

Articles of various shapes for use in many applications in which a cast or molded article formed from a water-hardenable mass is used, or is suitable for use, can be produced in accordance with the present invention, such articles either being prefabricated or cast or molded in situ as appropriate to their intended end use. Although in no way limited thereto, a particular application of the present invention resides in the production of an element such as a tile or panel, for example, for roof structure; such an article can be a precast sheet, if desired with reinforcing ribbon formed integrally therewith. Such a sheet can have apertures in it and/or suitably shaped portions which provide a means of attachment, for example, in interlocking or overlapping relationship to one or more similar sheets, to a supporting structure. In the case of panels for a flat roof structure, such panels can be placed on top of a primary, thermal insulation layer, which layer is laid on and supported by a structural roof as in known practice in the building industry. The exposed surface or surfaces of the resulting composite structure can then be asphalted in the usual way to produce a flat-surface roof. Advantageously, the insulation layer is formed by boards of a cellular polymer, for example, expanded polystyrene, which can be shaped to form the required drainage fall, if necessary.

Accordingly, the present invention also includes a method of forming a roof, wall or like surface of a building structure, which comprises placing, on a supporting structure, for example, an insulating layer carried by a supporting structure, a panel or panels which have been cast or molded from a water-hardenable mass containing in mixture therewith up to 2% by weight preferably 0.05 to 0.5% by weight, of fibrous reinforcing elements formed from a stretched and then fibrillated plastics film, which is preferably a polyolefin film. The present invention also includes the resulting roof, wall or like surface of a building structure.

A water-hardenable mass suitable for use in producing an article by casting or molding in accordance with the present invention can be formed by mixing water with the appropriate inorganic material or materials and adding thereto, either initially or during the mixing operation, up to 2% by weight of the water and inorganic material(s) employed, of said fibrous reinforcing elements. Advantageously, said fibrous reinforcing elements are added during the mixing operation and mixing is continued for a short period, for example, 3 to 5 minutes thereafter or less, depending on the mixing conditions employed, in order to distribute the reinforcing elements throughout the mass. Significantly less than 2% by weight of said fibrous reinforcing elements will often be sufficient to effect a desired and significant reinforcement of the resulting cast or molded article. The preferred embodiment of the invention contemplates the addition of 0.05 to 0.5% by weight of the fibrous reinforcing elements. In general the amount added should not be excessive to the extent that the resulting water-hardenable mass becomes difficult to work or handle or lump formation and segregation occurs during mixing.

A dry water-settable mass suitable for use, for example, in repairing an existing structure, can be formed by mixing the appropriate inorganic material or materials with 0.05 to 2% by weight of the inorganic material(s) employed, of said fibrous reinforcing elements. Advantageously, the fibrous reinforcing elements are roughly mixed with the dry inorganic material(s) to distribute the reinforcing elements throughout the mass. An air compressor designed to spray water into the dry mixture as the dry mixture of inorganic material(s) and fibrous reinforcing elements is leaving the nozzle of the air compressor, is used to direct the water-hardenable composition at the area of the structure to be repaired. The water-hardenable composition forms an impact-resistant surface on the structure. This method of repair obviates the necessity for first removing the segment of the structure to be repaired and then inserting a new replacement segment, thus resulting in a considerable saving in time and in labor costs. In addition, it provides a highly effective means of repairing structures, for example, dams or dikes, where removal of the segment would be impossible or highly impractical.

It is believed that the fibrous reinforcing elements of the present invention inhibit the spread of microcracks which develop in an article cast or molded from a water-hardenable mass when said article is deformed slightly under load. In contrast to the performance of steel or glass fibers in this respect, the fibrous reinforcing elements of the present invention have a low modulus of elasticity and it is believed that this contributes to their effectiveness in preventing the spread of microcracks and the ultimate conversion into macrocracks. It is usually not sufficient to add reinforcing elements formed from the stretched film as such because the desired reinforcing action is not achieved unless significant fibrillation occurs prior to or during admixture with the other components of the water-hardenable mass; however, the addition of reinforcing elements in a state of imminent fibrillation (as hereinbefore defined) is possible if adequate fibrillation can occur during the mixing operation. Preferably, the fibrous reinforcement is provided by the addition of either continuous filaments made by fibrillation of stretched polyolefin film or of short lengths of twine formed by twisting under fibrillating conditions a stretched polyolefin tape, for example, polypropylene tape and then stretch breaking or chopping the resulting twine into short lengths. In this procedure fibrillation can occur during the twisting operation, but if necessary an addition or alternative fibrillation operation can be used such as, for example, an air blast or a mechanical friction technique. A particularly suitable polypropylene twine is commercially available as "baler twine" and this can, if so desired, be readily chopped into short lengths for use in carrying out the present invention. Although fibrillation has already taken place during the manufacture of such polypropylene baler twine, it is possible that some additional fibrillation of the exposed surface of the chopped twine may occur during the mixing operation in which a composition curable by the addition of water in accordance with the present invention is formed. Since such polyolefin baler twine is much cheaper than polyolefin monofilament and the quantity of baler twine needed for reinforcement is much lower than is suggested by the above mentioned published work on chopped monofilament, fiber reinforcement of articles manufactured from a water-hardenable mass is now commercially acceptable in situations in which the kind of fibrous reinforcement described by Goldfein would have to be rejected for its high cost.

The starting material for a stretched and fibrillated polyolefin film is extruded polyolefin film which can be produced in various widths and thicknesses to yield, on slitting and stretching, a wide range of strands, ribbons or tapes, for example, between 6,000 and 65,000 denier strands. The extruded polyolefin film is longitudinally stretched using a stretch ratio of up to 1:20, preferably of the order of 1:10, whereupon the resulting stretched film can be subjected to slight forces acting in the lateral direction of the film, for example, by passing the stretched film between rubbing plates or rolls, which make the film fibrillate, i.e., split longitudinally over its surface area to form a mass of interconnected filaments. However, to effect fibrillation by twisting tapes, bands, or ribbons of such stretched film during the making of fibrillated polypropylene twine is preferred, and is considerably cheaper than the making of twine from spun monofilaments. Fibrillated twine, unlike twine made from a multitude of monofilaments, is interconnected at many places along its length. The high tenacity and also the high denier value which is attainable with the fibrous reinforcing elements of the present invention may account for the superior performance of such reinforcing elements in cast or molded articles produced in accordance with the present invention. Fibrillated polypropylene twine is marketed wound in the form of balls and it does not permanently curl. The twine may be used as a continuous filament or in short lengths. The short lengths of twine may be prepared by any of the procedures known in the art, for example by stretch-breaking or chopping. The twine is conveniently chopped into lengths which are 2 cm. or more long, but preferably 5 to 8 cm., e.g., 7.5 cm. long. When the short segments of twine are mixed with the components of a water-hardenable mass, for example, in a conventional concrete mixer the fibers open up only slightly without being shredded and the fibrous strands are distributed homogeneously through the mix without balling-up.

The amount of fibrillated film which can be added is limited by its effect on processability. Other factors, such as the water:cement ratio also affect processability and hence the amount of film that can be added. Excessive amounts of segmented film lead to formation of non-intermixable lumps of the fibrillated film. Amounts in the range from 0.05 to about 0.8% can generally be added without difficulty and amounts up to 2% may be employed in some compositions.

Usually, in carrying out the present invention, the reinforcing elements will be distributed throughout the water-hardenable mass from which articles are cast or molded, such distribution being as homogeneous as normal mixing conditions permit. However, the possibility of localizing the reinforcing elements in a load-bearing portion of the article, for example, by utilizing a conventional water-hardenable mass in addition to a water-hardenable mass in accordance with the present invention when filling a mold is not excluded; for example, one such mass can be poured in on top of the other during mold filling.

In general, the present invention can be applied to the manufacture of a wide variety of articles including, prefabricated sheets, slabs and panels for use in the building industry, since the improved strength thereof is of advantage not only during the use of the articles but also when handling them during mold removal, storage and transport.

It is also possible to effect appreciable cost savings by means of the present invention. For example, one might compare the cost of a 3 foot by 9 foot steel reinforced cast concrete panel with the cost of a 3 foot by 9 foot cast cement mortar panel reinforced with chopped-up polypropylene baler twine, manufactured in accordance with the present invention and having the same strength characteristics as the steel reinforced concrete panel. Because of the superior strength, volume for volume, of the chopped polypropylene baler twine/cement mortar casting, the panel in accordance with the present invention was about two-thirds the thickness of the steel reinforced cast concrete panel. This results in an overall materials cost saving of about 30% (of the cost of the cast concrete panel) and since the panel in accordance with the present invention was appreciably lighter in weight, further cost savings are achieved in handling and transport.

Although the present invention is particularly applicable to the manufacture of precast articles for use in the building industry and to a Guniting process, it is also possible to apply the present invention to the production of articles by casting in situ on the work site.

The following applications of the present invention can be mentioned as an indication of the many ways in which articles for the building industry can be made from hydraulic cement mortar and concrete mixes containing fibrous reinforcing elements. For example, cladding panels, lamp posts and fences that at present require steel reinforcement, pipe sections; closures; small boats; paving slabs; roof tiles; sea walls; load-bearing walls and machine foundations can be made in accordance with the present invention.

The present invention is applicable to inorganic materials in general which can be hardened by admixture with water. For example, one such application is the reinforcement of the gypsum core of plaster boards to reduce the high percentage of breakage during handling experienced at present with conventional plaster boards.

The present invention will be further described and illustrated by reference to the following examples:

EXAMPLE 1

A cement/sand/water mixture in a ratio by weight of 1:3:0.5 was mixed in a conventional concrete mixer and to this mixture 1% by weight of reinforcing elements formed from a stretched and fibrillated polypropylene fiber was added. The total mixing time was no longer than is usual for this type of cement/sand/water mixture without the fibrous material. The polypropylene fiber was a fibrillated twine of approximately 25,000 denier chopped in pieces 7.5 cm. in length. Four test beams each $10 \times 15$ cm. in cross-section and 120 cm. in length were cast in wooden molds from the resulting mixture, the filled molds being vibrated to allow air to escape prior to setting. The density of the resulting cast beams was between 2270 and 2340 g./l.

For comparison, four similar beams were made from the same cement/sand/water mixture but without the addition of the reinforcing elements. The flexural strength of each of the eight beams was measured by loading each beam in the center while it was supported at its ends. The average bending stress at failure for the four control beams was 55.5 kg./cm.$^2$; the average for the four beams with the reinforcing elements was 73.8 kg./cm.$^2$, i.e., an improvement of over 30%. The reinforced beams did not show a clean break at failure, the fibers still keeping the cracked beam together when subjected to a deflection of 30° and more. The results indicate that for many applyications adequate strength of a cast or molded article can be obtained with additions of less than 1% by weight of the fibrous reinforcing elements of the present invention.

EXAMPLE 2

A number of slabs were cast from a 3:1:0.5 portland cement/sand/water mixture containing as reinforcing elements chopped polypropylene baler twine. The slabs, which were 150 cm. long and 70 cm. wide, were cast in two thicknesses, namely 2 and 4 cm. The slabs were mechanically tested for impact strength after aging for 28 days to ensure thorough hardening. The baler twine had a weight in the range 23,000 to 30,000 denier and a staple length of approximately 7 cm.; it was made from unpigmented polypropylene by twisting stretched polypropylene tape. Other slabs of similar dimensions were made under otherwise identical conditions except that no baler twine was added to the mix. In all cases the sand and portland cement components were dry mixed for 2 minutes after which the water was added and mixing continued for 1½ minutes. When baler twine was added the mixing was continued for a further 2½ minutes during the first minute of which the twine (0.8% by weight of the total sand, cement and water) was added. Mixing was carried out in a 50-liter Eirich countercurrent mixer.

The slabs were cast in wooden molds, the mix being poured in, compacted in accordance with a standardized procedure for reinforced concrete and then shaken for 1 minute on a vibrating table at 4,000 cycles per minute to remove air. The slabs were hardened in the mold for 1 day under polyethylene sheeting and then aged for 7 days under water and then for 21 days at 20° C. and 50% relative humidity.

The sand used was a dried river sand of which 80% weight was of a size in the range 0.3 to 2.8 mm. (diameter of sieve mesh).

The 2 cm. thick slabs were impact tested by a falling weight test in which a steel ball 1 kilogram in weight was dropped onto the intersection of the diagonals of a slab from various heights, the slab being supported over its full width by two 70 cm. wide trestles situated 125 cm. apart.

The 4 cm. thick slabs were tested by a pendulum test in which a 25 kilogram leather sandbag 30 cm. in diameter and suspended by a rope 3 meters long was dropped against the intersection of the diagonals of a slab from various initial positions of the bag, the slab being held vertically against two rigid girders by clamps 125 cm. apart, each line of clamping extending over 70 cm., i.e., the width of the slab.

The results obtained were as follows:

(A) The 2 cm. thick slabs

The test slab made without baler twine broke completely at the impact load corresponding to a drop height of 50 cm., whereas the slab made in accordance with the present invention withstood without damage this impact load and showed only a crack at a drop height of 75 cm. A deflection of 8 mm. was observed on the center of the slab when the crack appeared and this deflection increased to 20 mm. as the drop height was increased, by 25 cm. increments, up to 250 cm. However, the slab did not break.

(B) The 4 cm. thick slabs

The test slab made without baler twine broke completely at the impact load corresponding to a drop height of 27 cm. The slab in accordance with the present invention withstood without damage impact loads corresponding to a drop height of 104 cm. at which point in the test three cracks formed over the whole width of the slab. However, the slab did not break up to the maximum drop height of the test which was 300 cm.

It will be seen from these results that the impact strength of slabs made from sand/cement/water mixtures can be improved considerably by the addition of reinforcing elements formed from a stretched and fibrillated polypropylene film and that such slabs show only cracking at the failure point as compared with the complete breakage encountered with conventional slabs. Moreover, the pieces of the slab remain connected together after the appearance of the crack(s) which allows the possibility of repair by grouting, for example, with an epoxy resin based adhesive in instances in which, with conventional slabs, the pieces would become separated and therefore not repairable by grouting; and the slabs could withstand impact loads higher than the impact load at first failure without complete breakage occurring.

EXAMPLE 3

By way of comparison a 4 cm. thick slab containing, as potential reinforcing elements, pieces of stretched (i.e., uniaxially oriented) polypropylene tape was produced from the cement/sand/water mixture referred to in Example 2 in the manner described in that example. The tape was in the form of pieces 5 to 7.5 cm. in length, 0.8 cm. in width and 50 microns in thickness and the amount incorporated in the cement/sand/water mixture was 0.4% by weight thereof, this being the maximum amount which could be incorporated without adverse effect on the workability of the mixture. The nature of the stretched polypropylene tape was such that it was potentially fibrillatable but not actually fibrillated or in a state of imminent fibrillation, and this example was carried out with the object of determining whether the required fibrillation of such a potentially fibrillatable film could be achieved during the mixing operation in which the water-hardenable mass was produced. In fact the test results obtained on the resulting cast slab showed that the required fibrillation was not achieved. When tested by the drop weight test referred to in Example 2 it was found that the slab broke completely into two pieces at a drop height of just under 50 cm. and it was observed that the exposed pieces of polypropylene tape which protruded from the broken edges of each piece were themselves unbroken and showed no readily detectable fibrillation; in fact, when the fracture occurred, the pieces of polypropylene tape lying across the line of fracture simply remained held in one or other part of the slab. Instead of reinforcing the slab, the pieces of tape weakened it; this effect was noticeable when such a slab was subjected to normal handling stresses since it was possible to crack the slab under handling conditions which a conventional slab of the same dimensions and without the polypropylene tape additive could withstand without cracking. It will be seen from this example that in order to act as reinforcing elements the pieces of polypropylene must be present in fibrillated condition in an article cast or molded from a water-hardenable mass.

EXAMPLE 4

Cladding elements in the form of slabs measuring 3 feet by 2 feet and ½ inch in thickness cast from a mixture of portland cement/sand/water containing chopped baler twine as described in Example 2 are used in making a flat roof. In one form the slabs are provided with two ribs each ½ inch wide and ½ inch deep extending along two adjoining edges, and two similar ribs extending along, but spaced about 1 inch inwardly from, the remaining two edges—these ribs, which form an integral part of the slab, serving to give greater strength during handling and also permitting assembly of a plurality of such slabs in interlocking or overlying relationship which facilitates assembly and eliminates butt joints. The ribbing can also provide a measure of ventilation, for example, for water vapor in the finished roof. The form and disposition alternatively—each slab can be flanged along one or more edges of such ribbing—can be varied to suit particular requirements, for example, one of the shorter edges, to provide a depressed portion for the reception of an edge of an adjoining slab.

The roof itself is formed by first laying sheets of expanded (i.e., cellular) polystyrene onto a supporting structure of conventional form, these sheets being cut to falls in known manner. The slabs are then laid on top of the expanded polystyrene sheets. Alternatively, a roof can be formed from slabs having expanded polystyrene of suitable thickness laminated to one face thereof. In either case the roof can be finished off by asphalting the exposed surfaces of the slabs in the usual way. Where butt joints are eliminated there is little risk of the asphalt damaging the expanded polystyrene underlay.

EXAMPLE 5

Reinforced concrete shells for pile driving were made using a concrete mix consisting of cement, sand, and gravel in a weight ratio of 1:2:2. The shells were 3 feet long with a wall thickness of 2½ inches and an external diameter of 15–21 inches. Production specimens were tested by impacting in axial direction with a 3-ton hammer, thus simulating the conditions encountered in practice.

The test was conducted in the following manner. Repeated blows were dealt until the shell under test showed the first cracks. The first 20 blows were given from a drop height of 1 foot, the second 20 from 1.5 feet, the third 20 from 2 feet, and every further 20 blows from 1 foot higher to a maximum of 4 feet high. The impact values for individual shell samples are derived by multiplying the number of blows with the square root of the drop height, and summating. Nine shells are tested in a series and an average value reported.

Fifteen and seventeen inch diameter piles using steel mesh as the reinforcing agent and fifteen inch and sixteen inch diameter piles using polypropylene film fibers (0.15% by weight) as the reinforcing agent were tested in the above manner.

The following results were obtained.

| Reinforcing agent | Diameter in inches | Impact value |
|---|---|---|
| Steel | 15 | 23 |
| Polypropylene | 15 | 50 |
| Steel | 17 | 70 |
| Polypropylene | 16 | 115 |

EXAMPLE 6

Reinforced concrete flat cable covers were made, having as dimensions 100 x 30 x 5 cm.

The testing specimens having conventional steel reinforcement and impact resistance of 4 drops from 1.5 m. height with a steel ball of 7.6 kg. was determined.

Similar covers produced by addition of 0.2% w. chopped polypropylene film fibers, instead of steel as the reinforcing agent, showed 12 drops as a result of the above impact test.

EXAMPLE 7

Part of a concrete river wall along the river Thames had deteriorated badly. A surface area of 62 x 5 feet was scabbled and defective concrete removed. No steel reinforcement was placed. The area was then sprayed with a concrete mix consisting of 1 part of cement and 3 parts of sand in which 0.6% by weight of polypropylene film fibers chopped to a length of about 1 inch had been added to the dry mix. Water was sprayed in at the last moment when the dry mix was leaving the nozzle. The large volume of air needed for the propulsion of the mix blew away part of the fiber and the concrete wall ultimately contained about 0.3-0.4% by weight of fiber. The thickness applied onto the wall was about 2½ inches.

The dry mixing and the transport was done as follows: a heap of sand, cement and the required fibers was roughly mixed with a spade, then scooped into a stirred hopper from which the mix was sucked by the vortex action of the air from a compressor into a 3 inch wide rubber hose. The hose was about 300 feet long and the dry mix was blown through it to the nozzle where water was added before the mortar and fibers impinged on the wall.

If desired, a water-hardenable mass in accordance with the present invention, for example, the water-hardenable mass from which cladding elements are cast can contain additives such as surface active agents for improving the processability of the mix, coloring matter and water repellants. It is also possible to dress the surface of a slab which will be exposed to view when the slab is in use for example as a cladding element with sand, small stones or rock chippings during the casting operation for decorative purposes.

We claim as our invention:

1. The method for preparing a reinforced hydraulic cementitious mass which comprises admixing with a wet uncured water-hardenable cementitious mass, prior to molding into the desired shape, a predetermined processable amount, from about 0.05 to 2% by weight, of fibrous reinforcing elements formed from a stretched and then fibrillated polyolefin film cut into 2-8 cm. long segments consisting of fibrous elements having multiple connections along their length.

2. The method according to claim 1 wherein said film is a polypropylene film.

3. The method according to claim 2 wherein said reinforcing elements are pieces of chopped twined fibrillated film, about 5 to 8 cm. in length, added in a concentration of about 0.05 to 1% by weight.

4. The method according to claim 1 wherein said water-hardenable mass comprises a portland cement and sand.

5. The method according to claim 4 wherein said water-hardenable mass also comprises a coarse aggregate.

6. A water-hardened cementitious mass produced in accordance with the method of claim 1.

7. A structural building element comprising as a structural component a panel formed of a water-hardened cementitious mass as defined in claim 6.

8. A water-hardened cementitious mass produced in accordance with the method of claim 2.

9. The method for preparing a reinforced hydraulic cementitious mass which comprises admixing with a wet uncured water-hardenable cementitious mass, prior to molding into the desired shape, a predetermined, processable amount, from about 0.5 to 2% by weight, of fibrous reinforcing elements formed from stretched and then fibrillated polyolefin film consisting of fibrous elements having multiple connections along their length.

10. A method for preparing a reinforced hydraulic cementitious mass which is curable in the presence of water which comprises admixing a dry cementitious mass with a predetermined, processable amount, from about 0.05 to 2% by weight, based on the total amount of water and inorganic materials comprised in the mass, of fibrous reinforcing elements formed from a stretched and then fibrillated polyolefin film consisting of fibrous elements having multiple connections along their length and adding sufficient water to form a reinforced hydraulic cementitious mass upon curing.

11. The method according to claim 10 wherein said reinforcing elements are pieces of chopped twined fibrillated film, about 5 to 8 cm. in length, added in a concentration of 0.05 to 0.5% by weight.

12. A dry, water-hardenable cementitious mass, produced by admixing a dry cementitious mass with a predetermined, processable amount, from about 0.05 to 2% by weight, based on the total amount of water and inorganic materials in the mass, of fibrous reinforcing elements formed from a stretched and then fibrillated polyolefin film consisting of fibrous elements having multiple connections along their length.

References Cited

UNITED STATES PATENTS

| 3,382,663 | 5/1968 | Frielingsdorf. |
| 3,252,934 | 5/1966 | Jankens. |
| 3,044,547 | 7/1962 | Jarboe. |

OTHER REFERENCES

Goldfein, S., Modern Plastics, April 1965, pp. 156, 158 and 160.

TOBIAS E. LEVOW, Primary Examiner

W. T. SCOTT, Assistant Examiner

U.S. Cl. X.R.

106—90, 314; 260—29.6